US007231428B2

(12) United States Patent
Teague

(10) Patent No.: US 7,231,428 B2
(45) Date of Patent: Jun. 12, 2007

(54) COMMUNICATION SYSTEM USING ALIAS MANAGEMENT RULES FOR AUTOMATICALLY CHANGING SENDER ALIAS IN A MESSAGE BASED ON GROUP THAT INCLUDES RECIPIENT ADDRESS

(76) Inventor: Alan H. Teague, 340 Ritch St., #7, San Francisco, CA (US) 94107

( * ) Notice: Subject to any disclaimer, the term of this patent is extended or adjusted under 35 U.S.C. 154(b) by 869 days.

(21) Appl. No.: 10/447,716

(22) Filed: May 28, 2003

(65) Prior Publication Data

US 2003/0229717 A1 Dec. 11, 2003

Related U.S. Application Data

(60) Provisional application No. 60/383,566, filed on May 28, 2002.

(51) Int. Cl.
*G06F 15/16* (2006.01)
(52) U.S. Cl. ...................... 709/206; 709/207
(58) Field of Classification Search ............... 709/206, 709/201, 205, 207; 706/47; 370/338; 345/752
See application file for complete search history.

(56) References Cited

U.S. PATENT DOCUMENTS

| 5,283,856 | A  | * | 2/1994 | Gross et al. | .............. | 706/47 |
| 6,385,645 | B1 |   | 5/2002 | De Jong |   |   |
| 6,519,234 | B1 |   | 2/2003 | Werkander |   |   |
| 6,606,647 | B2 |   | 8/2003 | Shah et al. |   |   |
| 6,606,649 | B1 |   | 8/2003 | Schwitters et al. |   |   |
| 2002/0061003 | A1 | * | 5/2002 | Sumner et al. | .............. | 370/338 |
| 2002/0095454 | A1 | * | 7/2002 | Reed et al. | ............... | 709/201 |
| 2002/0169840 | A1 | * | 11/2002 | Sheldon et al. | ............. | 709/206 |
| 2002/0188683 | A1 | * | 12/2002 | Lytle et al. | ................. | 709/206 |
| 2003/0105820 | A1 | * | 6/2003 | Haims et al. | ............... | 709/205 |
| 2003/0231207 | A1 | * | 12/2003 | Huang | ........................ | 345/752 |

OTHER PUBLICATIONS

International Search Report, International Application No. PCT/US03/16745, Oct. 8, 2003, pp. 1-2.
TMDA History, http://web.archive.org/web/20030412203500/http://www.tmda.net/history.html., Apr. 12, 2003.
SPAM Blocking, http://web.archive.org/web/20030605123532/www.deepeddy.com/tms.html, Jul. 27, 1998.
Chapter 2: Terminology and Acronyms, http://www.faqs.org/contrib/mailhelp/c101.html, Jun. 9, 2004.

* cited by examiner

*Primary Examiner*—Le Hien Luu
(74) *Attorney, Agent, or Firm*—Fish & Richardson, P.C.

(57) ABSTRACT

Methods and apparatus, including computer program products, for automated management and control of contact aliases. In general, in one aspect, the invention provides a computer implemented method for processing messages. The process includes maintaining rules of which a first rule specifies a first alias of a first sender to be used for messages sent from the first sender to a first group of one or more intended recipients. The process includes receiving a first message from the first sender to one or more intended recipients of the first group. The process includes changing the first message so that address information presented shows the first alias of the first sender.

34 Claims, 11 Drawing Sheets

My Account | My Details | Address Groups | Identities | Accept/Reject | Domains | Pending Emails

 Add New Domain - BEDOMAIN.COM

Register a domain to use the BePrivate service.

Please read the following options, then choose a structure that matches your requirements for individual or group email access within your domain.

*Sub-domains* provide functional addresses within a domain (e.g., *sales.mycomany.com*).

*Prefixes* provide separate groups of related addresses within a domain or subdomain (e.g., *abc-sales@mycompany.com* and *abc-support@mycompany.com*).

BEDOMAIN.COM

MULTI-USER DOMAINS

Use these to provide discrete sets of email addresses for members of groups or companies.

○ A) Each user will have their own address and prefix for this domain
    bob@bedomain.com, bob-chat@bedomain.com
    teri@bedomain.com, teri-web@bedomain.com ○ B) Each user will either have an entire subdomain to themselves or will have an address and prefix for a specific subdomain
    me@bob.bedomain.com, chat@bob.bedomain.com
    teri@sales.bedomain.com, teri-chat@sales.bedomain.com
    tom@sales.bedomain.com, tom-query@sales.bedomain.com ○ C) Each user will have their own address and prefix for this domain and all of its subdomains
    bob@bedomain.com, bob-chat@bedomain.com, bob@chat.bedomain.com
    teri@bedomain.com, teri-web@bedomain.com, teri@web.bedomain.com ○ D) Each user will have an entire sub-domain to themselves
    me@joe.bedomain.com, sales@joe.bedomain.com, web@joe.bedomain.com
    me@linda.bedomain.com, sales@linda.bedomain.com, web@linda.bedomain.com
    me@teri.bedomain.com, sales@teri.bedomain.com, web@teri.bedomain.com

SINGLE USER DOMAINS

Use these to configure a domain for use by a single individual.

○ E) I will use the entire domain myself
    me@bedomain.com
    sales@bedomain.com
    support@bedomain.com ○ F) I will use the entire domain myself and all of its sub-domains myself
    me@bedomain.com
    me@support.bedomain.com
    me@sales.bedomain.com

DSN SETUP OPTIONS

○ I registered this brand new domain through your service a few minutes ago.
○ I requested a transfer of a previously unused domain to your service a few minutes ago.
○ I want you to be my name server for this domain.
○ I want you to only handle the email service for this domain.

Submit | Cancel

FIG. 6B

Address Goups

CURRENT ADDRESS GROUPS

| Edit Address Group | Possible Identities |
|---|---|
| beprivate.340ritch.net | alan@beprivate.340ritch.net, *@beprivate.340ritch.net |
| beprivate.com | teague@beprivate.com, alan@*.beprivate.com, at-*@*.beprivate.com |
| beprivate.net | teague@beprivate.net, alan@*.beprivate.net, at-*@*.beprivate.net |
| beprivate.org | alan@beprivate.org, at-*@beprivate.org |
| ibep.be-private.com | alan@ibep.be-private.com, aht-*@ibep.be-private.com |
| loft7.340ritch.net | alan@loft7.340ritch.net, *@loft7.340ritch.net |
| morphdog.com | alan@morphdog.com, *@*.morphdog.com |
| morphdog.net | alan@morphdog.net, *@*.morphdog.net |
| teague.b-private.com | alan@teague.b-private.com, *@teague.b-private.com |
| teague.b-private.com | alan@teague.b-private.com, *@teague.b-private.com |

The above group is labeled 612.

ADD ADDRESS GROUP

Using one of my domain names...
  My Domains: [(Select Domain)  .] — 614
  [Add Group]

OR

Using someone else's domain name...
  Domain Name: [                  ] — 616
  Authorization Code: [          ] (OK-XXXX-XX)
  [Add Group]

OR

Retrieve from an existing POP account ...
  External Account: [Add POP Account] — 618

FIG. 6C

My Account | My Details | Address Groups | Identities | Accept/Reject | Domains | Pending Emails

Preferred Identities

Default Identity - teague@beprivate.com  Change default
Use the above Default Identity when sending to someone new or to groups which do not share a common Preferred Identity  — 636

Preferred Identities for Sending Email
Show only recipients which match: [ ]
          Show only identities in: [*beprivate.com]
                                    restrict list  show all   — 638

◁ Prev 1 2 3 4 5 Next ▷

| For this Recipient (sorted) | Use this Identity (sorted by) |
|---|---|
| ☐ administrator@beprivate.com | * teague@beprivate.com |
| ☐ administrator@webmail.beprivate.com | * teague@beprivate.com |
| ☐ alerts-feedback@yahoo-inc.com | * aht-yahoo@beprivate.com |
| ☐ alerts-reply@yahoo-inc.com | * aht-yahoo@beprivate.com |
| ☐ amylucas@mkmn01.com | * at-intellireach@beprivate.com |
| ☐ boolden@accel.com | * teague@beprivate.com |
| ☐ billpay@wellsfargo.com | * at-wellsfargo@beprivate.com |
| ☐ boa-devel-admin@lists.sourceforge.com | * at-boa@beprivate.com |
| ☐ bob@beprivate.com | * teague@beprivate.com |
| ☐ bob abbott@icgcomm.com | * teague@colo.beprivate.com |
| ☐ brad.ferguson@framegroup.com.au | * teague@beprivate.com |
| ☐ brian@brianjudy.com | * teague@beprivate.com |
| ☐ bunny bowman@icgcomm.com | * teague@colo.beprivate.com |
| ☐ cakoncal@msn.com | * at-4thsna@beprivate.com |
| ☐ carlos johnson@icgcomm.com | * teague@colo.beprivate.com |
| ☐ charles bing@icgcomm.com | * teague@colo.beprivate.com |
| ☐ christopher werpy@icgcomm.com | * teague@colo.beprivate.com |
| ☐ clearcom@secure.linkpt.net | * at-ccproc@beprivate.com |
| ☐ condor@queernet.org | * teague@.beprivate.com |
| ☐ customersupport@echostar.com | * at-dishnetwork@.beprivate.com |

640, 642

Delete Selected                         Save changes  Cancel

◁ Prev 1 2 3 4 5 Next ▷

FIG. 6E

My Account  My Details  Address Groups  Identities  Accept/Reject  Domains  Pending Emails

Accept/RejectRules

Filters – Use these fields to filter the displayed list

Show only recipients which match: [                    ] ⎫
    Show only identities in: [*beprivate.com]        ⎬ — 644
         <u>restrict list</u>   <u>show all</u>  ☑ Show rejected ⎭

◁ |Prev 1 2 3 4 5 Next| ▷

| For this Recipient (sorted) | Identity (sort by) | Current Action (sort by) |
|---|---|---|
| ☐ anything@anything.beprivate.com | teague@beprivate.com | * Accept it |
| ☐ anything@icgcomm.com | teague@colo.beprivate.com | * Accept it |
| ☐ anything@secure.linkpt.net | at-ccproc@beprivate.com | * Accept it |
| ☐ anything@securityspace.com | at-securityspace@beprivate.com | * Accept it |
| ☐ anything@wildwestdomains.com | at-wwd@beprivate.com | Reject it |
| ☐ bugtraq-anything@securityfocus.com | teague@beprivate.com | Accept Grou |
| ☐ pma-anything@beprivate.com | teague@beprivate.com | Accept Grou |
| ☐ sentto-anything@returns.groups.yahoo.com | at-4thsna@beprivate.com | * Accept it |
| ☐ 9c7eb0e72b744c27-admin@www-124.ibm.com | at-jfs@beprivate.com | * Accept it |
| ☐ alerts-feedback@yahoo-Inc.com | aht-yahoo@beprivate.com | * Accept it |
| ☐ alerts-reply@yahoo-Inc.com | aht-yahoo@beprivate.com | * Accept it |
| ☐ amylucas@mkmn01.com | at-intellireach@beprivate.com | * Reject it |
| ☐ bgolden@accel.com | teague@beprivate.com | * Accept it |
| ☐ billpay@wellsfargo.com | at-wellsfargo@beprivate.com | * Accept it |
| ☐ boa-devel-admin@lists.sourceforge.net | at-boa@beprivate.org | * Accept it |
| ☐ bob_abbott@icgcomm.com | teague@colo.beprivate.com | * Accept it |
| ☐ bob_abbott@icgcomm.com | teague@beprivate.com | * Accept it |
| ☐ bob_abbott@icgcomm.com | aht-dns@beprivate.com | * Accept it |
| ☐ brad.ferguson@framegroup.com.au | teague@beprivate.com | * Reject it |
| ☐ brand@descartes.responsible.com | teague@beprivate.com | * Accept it |

646     648     650

<u>Delete Selected</u>                                           <u>Update changes</u>

◁ |Prev 1 2 3 4 5 6 7 Next| ▷

FIG. 6F

COMMUNICATION SYSTEM USING ALIAS MANAGEMENT RULES FOR AUTOMATICALLY CHANGING SENDER ALIAS IN A MESSAGE BASED ON GROUP THAT INCLUDES RECIPIENT ADDRESS

The present application claims priority from U.S. Provisional Application No. 60/383,566, filed May 28, 2002, the disclosure of which is hereby incorporated by reference in its entirety.

BACKGROUND

The present invention relates to network communications.

Communications sent over networks can be implemented in the form of messages. A message usually includes content, which can be represented by, for example, text, images, and sound. A message also usually includes address information of a sender of the message as well as address information of an intended recipient of the message. Generally, the sender initiates the message, and the receiver, or intended recipient, is the target or the addressee of the message. A sender can be, for example, a human operator, a computer program product, and a computing system. An intended recipient can likewise be any of the mentioned entities. An intended recipient can be one or more entities. For example, a particular message can be addressed to an intended recipient representing a group of human operators. Senders and intended recipients are correspondents.

There are generally different types of messages. Emails, short-message-service ("SMS") messages, voice messages, page messages, instant messaging messages, and facsimiles (i.e., faxes) are examples of messages.

Different types of messages can be sent over different types of networks. Email messages, for example, are typically sent over networks that include email servers. The email servers can use the Simple Mail Transfer Protocol ("SMTP"). Faxes, for example, are typically sent over networks that include fax machines. Faxes may also be sent over a network that includes computers that have fax applications. Voice messages, for example, are typically sent over a network that include voice mail servers. The networks mentioned can be part of or include portions of the Internet.

A message can also be sent over an interprocess communication environment ("IPCE"), which may include one network, several networks, or a subset of a network. A message can be communicated between processes in different IPCEs by relaying through a process connected to two (or more) IPCEs. That is, mail can be relayed between hosts on different transport systems by a host on both transport systems.

A standardized form of contact information (e.g., a contact alias) can identify one or more of the particular sender and intended recipient. Emails, for example, usually include standardized contact information, usually in the following form: "local_part@domain_part". Telephone numbers for voice and fax, for example, also usually include standardized contact information. The standardized contact information generally includes digits that represent a country, digits that represent an area code, and digits that represent a terminal device.

The above mentioned networks can include technology that supports a mapping of multiple addresses to a single delivery location. Specific email addresses of a human operator can be linked, i.e., aliased, to an actual email account the human operator uses to connect to the network. For example, personal@BePrivate.com and business@BePrivate.com can both be aliased to alan@pop.BePrivate.com. Messages sent to either of the first two addresses will be delivered to the third account. Similarly, different telephone numbers can map to a single telephone or facsimile machine. Message addresses that are aliased, regardless of the type of message, are referred to in this specification as contact aliases.

SUMMARY

The present invention provides methods and apparatus, including computer program products, for automatic management and control of contact aliases.

In general, in one aspect, the invention provides a computer implemented method for processing messages. The process includes maintaining rules of which a first rule specifies a first alias of a first sender to be used for messages sent from the first sender to a first group of one or more intended recipients. The process includes receiving a first message from the first sender to one or more intended recipients of the first group. The process includes changing the first message so that address information presented shows the first alias of the first sender.

In general, in one aspect, the invention features a computer program product, tangibly stored on machine readable medium, for processing messages. The product includes instructions operable to cause a programmable processor to maintain rules of which a first rule specifies a first alias of a first sender to be used for messages sent from the first sender to a first group of one or more intended recipients. The product includes instructions to receive a first message from the first sender to one or more intended recipients of the first group. The product includes instructions to change the first message so that address information presented shows the first alias of the first sender.

In general, in another aspect, the invention provides a network transmitting agent for a specific type of network and associated management utilities. These network specific agents use stored information to lookup appropriate behavior rules for the task at hand. These rules define criteria and processes for at least accepting, rejecting, verifying, validating, and modifying incoming and outbound communications and for adding, modifying, and deleting rules. The management utilities for the network specific agents provide a means for adding, modifying and deleting rules, configuration settings, and other agent state information.

In one implementations where messages are email sent over an email communication network, the invention provides a specialized SMTP server and associated management utilities for processing emails, including managing consistent use of aliases. The management utilities support both a Web-based (e.g., one using HTTP(S)) and validated email interface. The present invention supports SMTP, POP3, or IMAP4 compliant email clients such as Eudora, Outlook Express, and Netscape Mail without requiring source-code level changes to those applications.

The invention can be implemented to realize one or more of the following advantages. A system as described in this specification can, for outbound messages, facilitate consistent use of aliases. The system can ensure that a message outbound to a particular intended recipient includes the alias the sender has designated for use with messages addressed to the particular intended recipient. The system allows one to define new aliases and change existing aliases by either passive input or active input. Passive input includes inserting a new alias in a from field of a message. Active input includes input received through an administrative interface, which can be Web-based.

The system allows users to maintain more than one email identity and yet use a single mailbox for all email they receive. The identity feature is further enhanced with an automatic mapping facility allowing each externally visible identity to map onto the email addresses of one or more correspondents. Users can thus appear to have a different email address (identity) for each person with whom the user correspond, because the server automatically ensures all outbound email contains the correct identity for that particular correspondent.

The system can, for incoming and outbound messages, apply access and processing rules. The rules can be defined to reduce spam. The system can, for example, stop accepting messages from senders whom the system does not recognize while continuing to accept messages from senders whom the system does recognize. A user, thus, need not change the address at which the user receives messages to keep from receiving spam.

The system can include a rules engine and a database, in which the access and processing rules can be maintained. The rules engine can be built on top of the database, which can be integrated into all mail transfer subsystems that govern both inbound and outbound email acceptance and outbound identity mapping. The rules engine allows users to restrict exactly whom they wish to correspond with through the use of access and processing rules. The rules can specify single entities or use regular expressions, allowing users to block all entities or any sub-set of the entities matching a specified pattern. The rules can include default rules and customized rules. The rules can be changed by the rules engine. That is, the system can be self-adapting. Further, the system can adapt the access and processing rules automatically and in real time.

The system can support different levels of default actions for receipt of messages sent to an intended recipient from a sender not recognized by the system (i.e., a new sender). The levels include: (i) accept for delivery any messages from a new sender, reject only messages from senders the intended recipient specified; (ii) request verification from the intended recipient, i.e., ask the intended recipient whether the message is to be rejected or accepted; (iii) request confirmation from the new sender before delivering the message; (iv) request verification from the intended recipient and confirmation from the new sender; (v) block any messages from new senders, accepting messages from senders with whom the intended recipient initiates communication.

Each of the above described levels reduces the intended recipient's susceptibility to spam, with the fifth level eliminating all spam except that which actually comes from known correspondents. Another unique productivity-enhancing feature of the rules engine is that rules for individual correspondents and even entire Internet domains can be updated through the user's client computer itself, without recourse to using resources such as Web-based administration facility. For example, in implementations where the messages are emails:

Forwarding a particular email to a "REJECT" address updates the rules such that emails having the same address pattern instance as the particular email will not be accepted for delivery.

Sending a reply to a Verify request, which was sent in response to a particular email from a correspondent, adds a rule that accepts future email having the same address pattern instance as the particular email. In addition, the system delivers any pending emails having the same address pattern instance as the particular email.

Sending an email to a correspondent not recognized by the system (i.e., a new correspondent) will automatically create an identity mapping based on both the correspondent's address and either the address in the "FROM" field or the user specified default identity. In addition, the new correspondent will be automatically added to the rules for that identity allowing return email to be accepted automatically.

Sending an email to an old correspondent with a different "FROM" field will update the identity mapping such that "FROM" address is the new default. Additionally, the new correspondent is and automatically added to the rules for that identity.

Receiving email from a correspondent to a new identity will automatically create the new identity, e.g., while signing up on a website you can create a new address such as memsn.com@there.com such that the incoming promotional email from that website automatically creates the identity.

A user of the system can therefore accomplish fine-tuning of the rules for the system through the day-to-day use of their favorite email client.

The rules can be defined for multiple users of the system. The database of rules can be segmented on a user by user basis. For example, rules for different users can be maintained in different tables. By being so segmented, the database is scalable. Furthermore, a user changing rules pertaining to the user locks only the user's respective segment and not segments of other users.

The system can use address patterns that include both sender and intended recipient address information. By doing so, the system provides a fine-grained level of control over message acceptance and processing. In one implementation, the system uses regular expression to define groups of aliases. In one implementation, the system controls and manages messages at the SMTP level so that client resources need not be consumed for the purposes of access control. In addition, server resources consumed for processing rejected messages are minimized. By supporting the use of different contact aliases for different purposes, the system provides users with the advantage of tracking unauthorized use of specific contact aliases by the corresponding trusted parties.

A contact alias need not be abandoned when it becomes the target of a large amount of unwanted messages (i.e., spam). The system can reject messages that are sent from new senders and addressed to the contact alias while continuing to accept messages that are sent from previous senders and addressed to the contact alias. The system can also accept messages sent from recipients of outgoing messages from the contact alias.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 6A-6F show examples of administrative interfaces.

Like reference numbers and designations in the various drawings indicate like elements.

DETAILED DESCRIPTION

Figure 1:
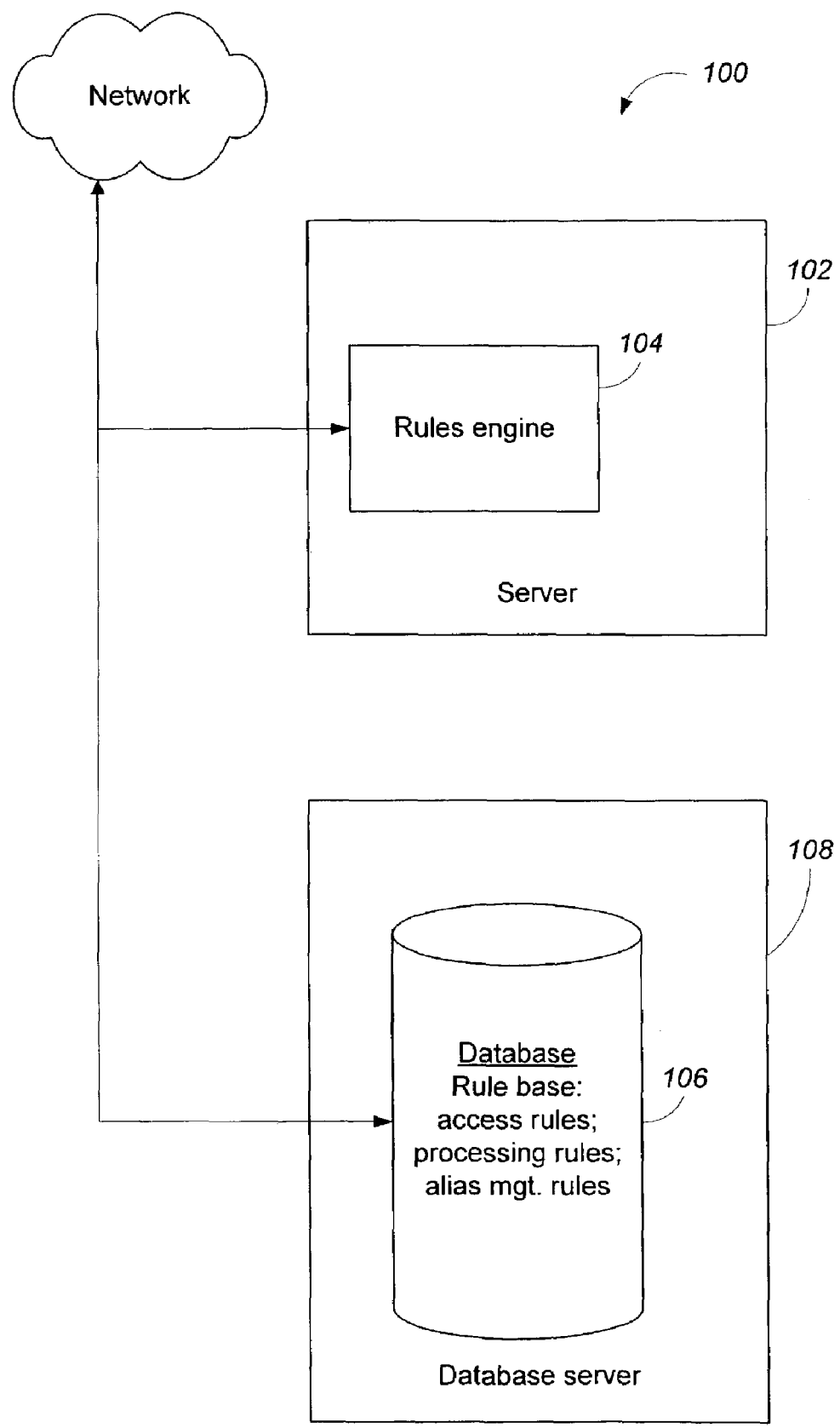
FIG. 1 shows a block diagram of a system for processing messages.

FIG. 1 shows a block diagram of a system 100 for processing messages. The system includes a server 102, a rules engine 104, a database 106, and a database server 108. Alternatively, the system can include one server where the rules engine and the database can reside. The system 100 can include other computing components. For example, the system can include one or more other servers and other computer program products. The rules engine 104 can maintain a rule base stored in the database 106.

The rule base can include access and processing rules for messages. Each of the rules can include an address pattern key and one or more instructions for message processing. An address pattern key is an expression that specifies one or more address pattern instances. In one implementation, the address pattern keys are regular expressions. Each address pattern key can include two portions, one for address information associated with a sender (i.e., the sender portion) and another for address information associated with an intended recipient (i.e., the intended recipient portion). Each portion can include a regular expression, which is a formula for matching strings that follow a pattern. Regular expressions similar to those that can be included in the rules are further described in Portable Operating System Interface ("POSIX®") 1003.2, which is hereby incorporated by reference in its entirety. Alternatively, the address pattern key can include one regular expression for address information associated with both a sender and an intended recipient.

Figure 2A:
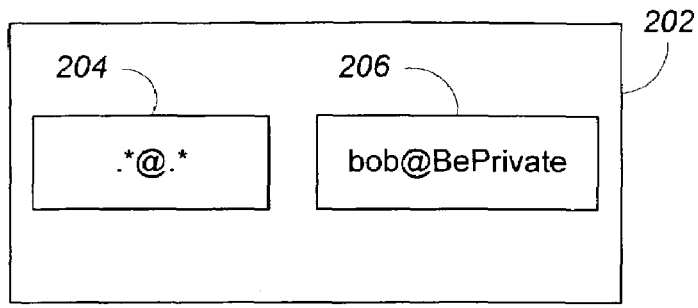
FIGS. 2A-2C show examples of address pattern keys that are regular expressions and of a rule.
Figure 2B:
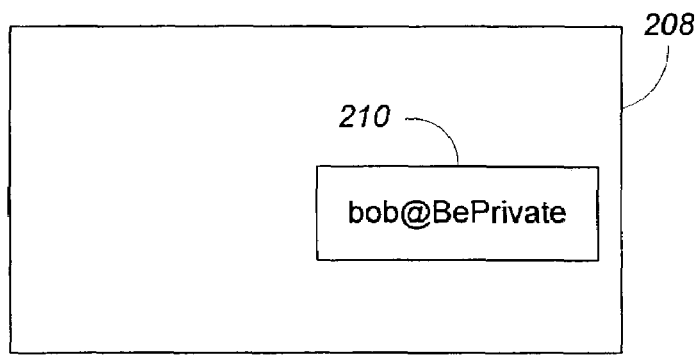
Figure 2C:
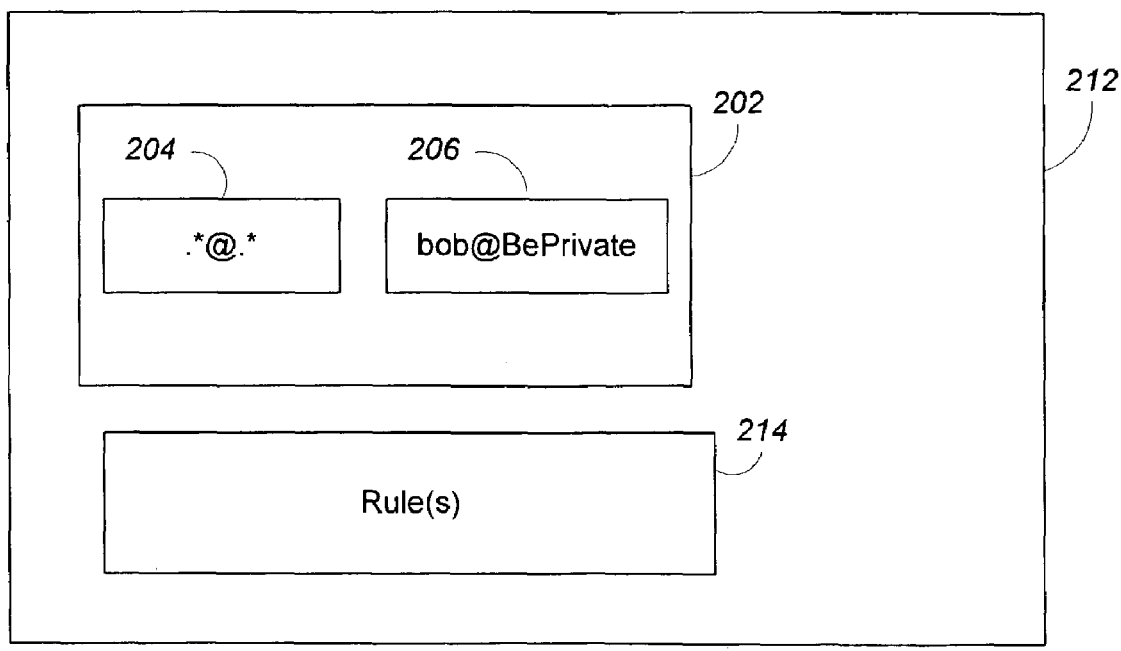

FIGS. 2A and 2B show example regular expressions. FIG. 2A shows an address pattern key 202 that includes a sender portion 204 and an intended recipient portion 206. FIG. 2B shows an address pattern key 208 that includes an intended recipient portion 210 but not a sender portion. Address pattern keys like the address pattern key 208 are usually included in rules for alias management. FIG. 2C shows an example rule 212 that include the address pattern key 202 and one or more instructions 214. Table 1 shows examples of address pattern keys and the corresponding address pattern instances specified by, i.e., match with, the address pattern keys. In the examples, the messages are emails. However, the messages can be any type of messages. For example, the messages can be phone numbers, in which case the regular expressions will include numbers.

TABLE 1

| Address Pattern Key | | Matching Address Pattern Instances | |
|---|---|---|---|
| Sender Portion | Intended Recipient Portion | Sender Portion | Intended Recipient Portion |
| bob\.jones@bobdomain\.com | bob@legal\.bobdomain\.com | bob.jones@bobdomain.com | bob@legal.bobdomain.com |
| .*@{.*\.}bobdomain\.com | bob@legal\.bobdomain\.com | bob.jones@bobdomain.com | bob@legal.bobdomain.com |
| | | bob.jones@private.bobdomain.com | bob@legal.bobdomain.com |
| | | sally.jones@bobdomain.com | bob@legal.bobdomain.com |
| | | Any sender which ends with "@bobdomain.com" | bob@legal.bobdomain.com |
| | | Any sender which ends with ".bobdomain.com" | bob@legal.bobdomain.com |
| .*@.* | bob@legal\.bobdomain\.com | Any sender matches this pattern | bob@legal.bobdomain.com |
| alan@BePrivate.com | bob-[^.-]+@web\.bobdomain\.com | alan@Beprivate.com | bob-yahoo@web.bobdomain.com |
| | | alan@BePrivate.com | bob-walmart@web.bobdomain.com |
| | | alan@BePrivate.com | bob-nyctrip@web.bobdomain.com |
| | | alan@BePrivate.com | Any receiver which begins with "bob-" and ends with "@web.bobdomain.com" |

One or more of the rules can also include one or more processing instructions. The instructions can specify how messages are processed and how the rules are maintained and updated. The instructions can be, for example, any combination of: accept the message for delivery, reject the message, accept the message and hold until confirmed, accept the message and hold until verified, accept the message and hold until confirmed and verified, accept the message for a duration after a particular date, accept a particular number messages and then reject, accept message until a particular date, forward messages to a particular list of locations, and define a rule. Confirmation may include customized confirmation request. A user of the system can have, for example, different confirmation request templates for different intended recipients. Further, the user can have different confirmation request templates for different address pattern instances. The system uses a confirmation request template, in conjunction with a particular message, to generate a confirmation request for the particular message. In one implementation, the user may customize the confirmation request templates by using an administrative interface, for example, a Web-based administrative interface. Updating includes defining a new rule, modifying an existing rule, and deleting an existing rule. The instructions can relate to alias management. The instructions can, for example, specify which alias of a sender is used for a message the sender is sending to a particular intended recipient. Alias management rules can be stored separately from the access and processing rules. For example, the system can have two tables for each system user, one for alias management rules and the other for access and processing rules.

The rules can be, for example, IF-THEN rules, IF-NOT-THEN rules, IF-THEN-ELSE rules, and any combination thereof. The system can include other types of rules.

In general, the system can be connected to send and receive messages to and from networks such as the Internet, and also to send to and receive messages from clients. The system can receive the message from any point in a network to which the system is connected. The system can receive the message from, for example, a client computer or a server. The system and its implementations are further described below.

The system can include memory where the system can store messages for future delivery. When the system receives a message, the system determines what action to take. After the system determines what action to take, the system can store the message in the memory for future delivery.

Methods for Processing Messages

Figure 3:
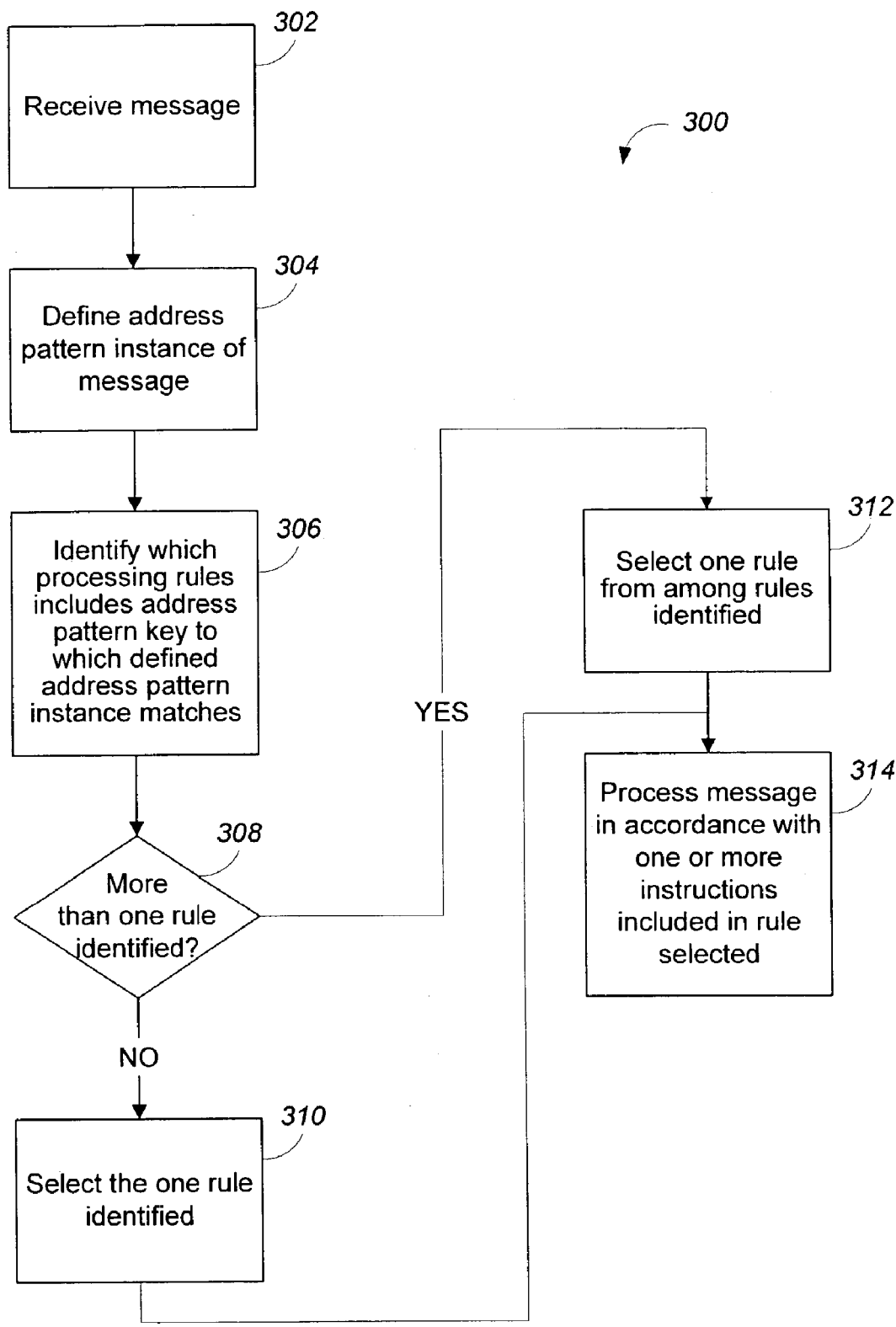
FIG. 3 shows a method for processing messages.

FIG. 3 shows a method 300 for processing messages. A system, such as the system 100, performing method 300 receives a message (step 302). The message can be, for example, an email, an SMS message, a fax, an instant message, and a voice message. The message includes address information. The address information can include address information associated with the sender of the message and address information associated with the intended recipient of the message. The message can include content. The content can include attached electronic documents. An electronic document does not necessarily correspond to a file. A document may be stored in a portion of a file that holds other documents, in a single file dedicated to the document in question, or in multiple coordinated files.

The system defines an address pattern instance of the message (step 304). An address pattern instance of a message can be a combination of address information associated with a sender of the message and address information associated with an intended recipient of the message. Examples of address information associated with a sender can include and are not limited to an alias of the sender, a domain of the user, a phone number of the sender, an IP address of the sender. Examples of address information associated with the intended recipient similarly include and are not limited to an alias of the intended recipient, a domain of the intended recipient, a phone number of the intended recipient, an IP address of the intended recipient. There is generally one address pattern instance which can be defined for a given message. Multiple messages can have the same address pattern instances.

The system identifies which of the processing rules includes an address pattern key to which the defined address pattern instance matches (step 306). There may be instances when there are no matches, in which case the system can identify a default rule. In general, however, there are one or more rules with which the address pattern instance matches, and there are one or more rules identified. The system determines if there is more than one rule identified (decision step 308). If there is only one rule identified, then the system selects the one rule identified (step 310). If there are more than one rule identified, then the system selects one rule from among the rules identified (step 312). Criteria for the selection can be based on the specificity of the address pattern keys included in the rules. The system can select, for example, the rule that include the most specific address pattern key. Alternatively, criteria for selection can be based on an order of priority. In one implementation, the system includes a restricted set of rules. The rules are ordered by priority, and the system selects a matching one with the highest priority. The order of priority can be defined by an administrator, one or more users, or any combination of administrator and users.

The system processes the message in accordance to the one or more instructions included in the rule selected (step 314). The processing can occur at a point in the network such that consumption of client computing resources are reduced or minimized. Processing can occur, for example, at an SMTP server. Processing can include any action or operations one can apply to a message and the rules. For example, processing can include but is not limited to: accepting a message for delivery; rejecting a message; accepting a message, requesting verification, and delivering the message upon receipt of verification; accepting a message, requesting confirmation, and delivering the message upon receipt of confirmation; accepting a message, requesting confirmation and verification, and delivering the message upon receipt of confirmation and verification; defining a new rule; or any of the above combination.

Figure 4:
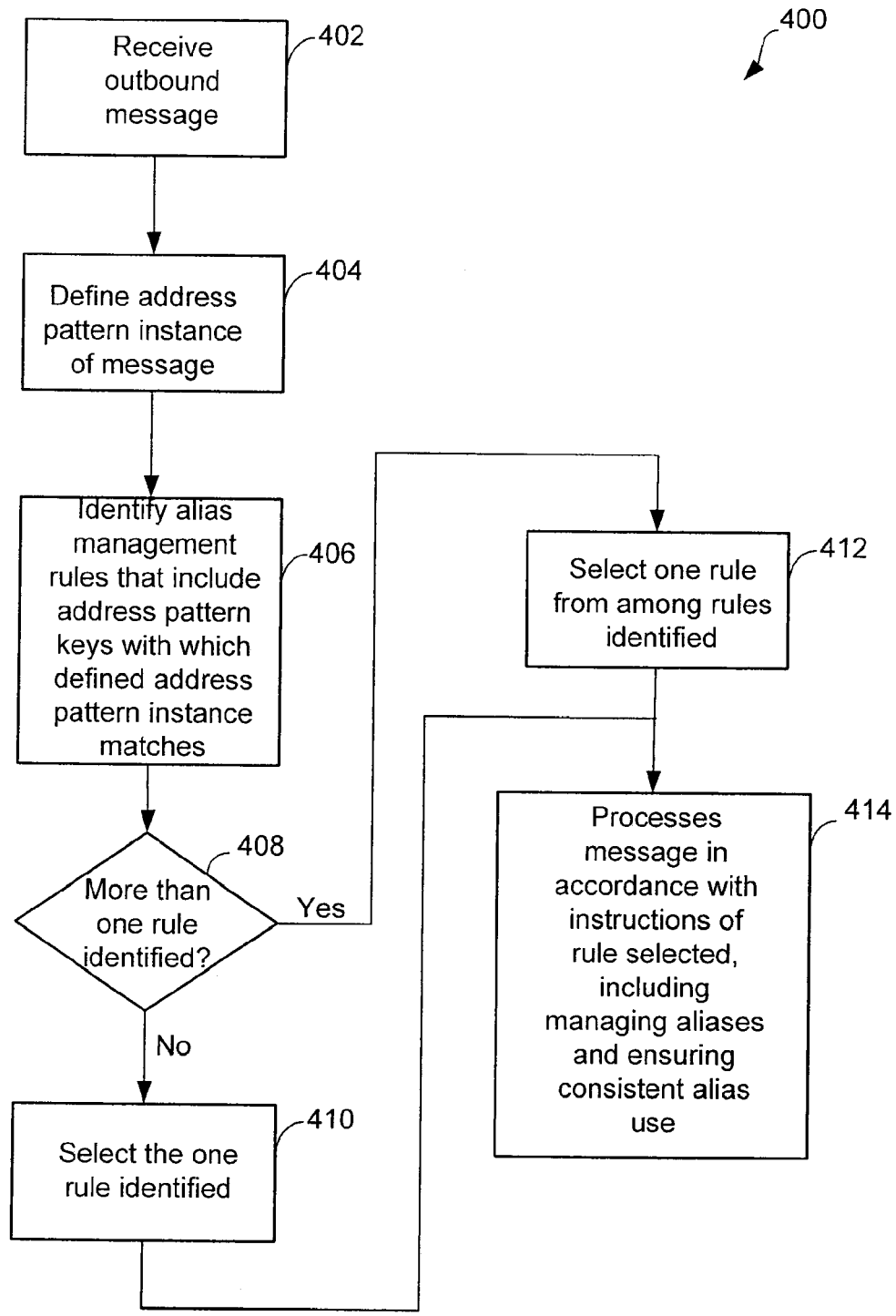
FIG. 4 shows another method for processing messages.

FIG. 4 shows a method 400 for processing messages. A system, such as the system 100, performing method 400 receives an outbound message (step 402). The message can be, for example, an email, an SMS message, a fax, an instant message, and a voice message. The message includes address information. The address information can include address information associated with the sender of the message and address information associated with the intended recipient of the message. The message can include content. The content can include attached electronic documents.

The system defines an address pattern instance of the message (step 404). An address pattern instance of a message can be the address information associated with an intended recipient of the message.

The system identifies alias management rules that include address pattern keys with which the defined address pattern instance matches (step 406). The alias management rules maps aliases to intended recipients. That is, an alias management rule specifies which of the sender's aliases is to be used for which of the intended recipients. The system determines if there is more than one rule that includes an address pattern key with which the address pattern instance matches (step 408). If there is only one rule, then the system selects this rule (step 410). If there are more than one rule, then the system selects a rule from among those identified (step 412). Criteria for the selection can be based on the specificity of the address pattern keys included in the rules. The system can select, for example, the rule that includes the most specific address pattern key. Alternatively, criteria for selection can be based on an order of priority. In one implementation, the system includes a restricted set of rules. The rules are ordered by priority, and the system selects the matching one with the highest priority. The order of priority can be defined by an administrator, one or more users, or any combination of administrator and users. The system processes the message in accordance with the instructions of the rule selected (step 414). Processing includes managing aliases and ensuring consistent alias use. The system can determine whether the alias currently in the message is the same as the alias specified in the rule selected, and changing the alias in the message as appropriate, for example, to be the same as the one specified in the rule selected. Processing can also include defining new rules. Processing can include, for example, changing an alias specified in the rule selected to be the same as the alias of the current message. Alternatively, processing can include other actions such as, for example, those described above with respect to method 300.

In one implementation, the system is a privacy-oriented email system that includes an integrated suite of high-performance email processing server applications and a rules engine driven by a database that contains account and configuration information. Together, these applications manage the privacy of email identities used for correspondence. Each user has one mailbox that contains all of the email for all of his or her email identities. The system keeps track of which identity is used with each correspondent. Additionally, each mailbox can span multiple domains allowing a user's choice of identity to also span multiple domains. As will be seen, also included in the system suite are a Web-based user account, domain, and identity administration application and a Web-mail application.

Figure 5:
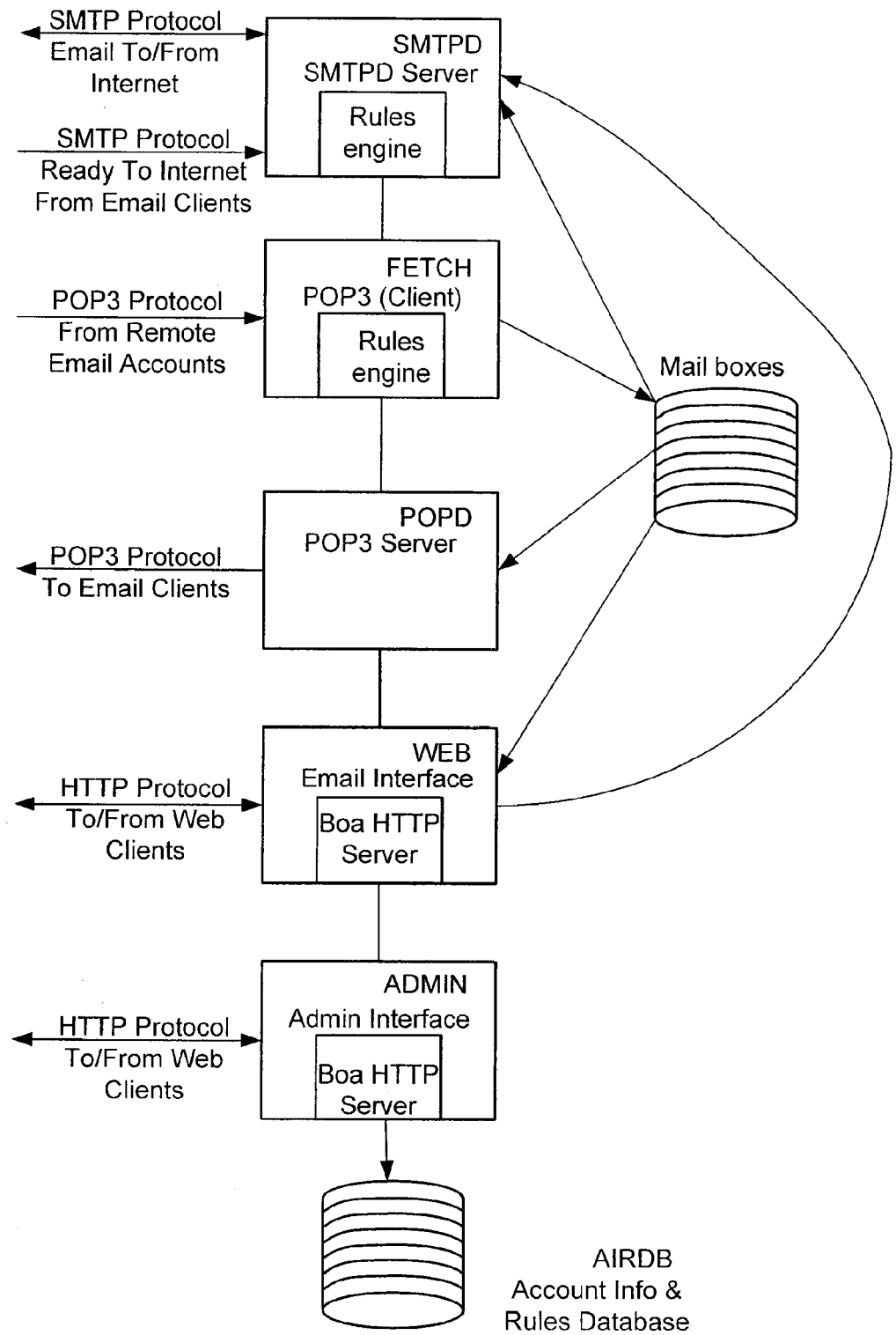
FIG. 5 shows an implementation of the system for processing messages.

As shown in FIG. 5, system 500 includes: an SMTPD component 502, a POPD component 504, a FETCH component 506, an ADMIN component 508, a WEB component 510, and an AIRDB (account information & rules database) component 512. The components are connected as indicated to each other, the Internet, email clients, remote email accounts, and Web clients.

The SMTPD component 502 is a server for processing both inbound messages from the Internet and outbound messages from email clients. The POPD component 504 is a POP3 server for establishing inbound email client connections. The FETCH component 506 is a POP3 client for fetching email from remote POP3 servers. The ADMIN component 508 is a computer program product that provides a Web-based interface for administering user accounts, domains, and identities. The ADMIN component 508 resides on an HTTP server, for example, the Boa Webserver. The WEB component 510 is a computer program product that provides a Web-based email client interface. The AIRDB 512 is database of user account information used by all of the above components. The following described each, component in further detail.

SMTPD—Intelligent SMTP Server

The SMTPD server 502 is a mail transfer agent utilizing the SMTP protocol standard. It acts as a server for sending and receiving the following:

Inbound email for all domains and sub-domains configured in the AIRDB component 512.

Relayed (outbound) email from user email clients, provided they have checked their email account from the same IP address in a specified time period, for example, the last 15 minutes.

Supports the extended SMTP commands for pipelining of commands and for supporting 8-bit mime types.

In one implementation, the SMTPD server 502 is compliant with the SMTP standard, according to RFC 2821.

The following describes inbound email delivery. In order to receive email, the inbound destination email address must map to configured domain or sub-domain, then to an address group corresponding to a user account, and then to a mailbox. Once the inbound address has been mapped to a user's mailbox, the email will only be accepted and processed according to the email handling rules for the correspondent in the FROM address of the SMTP envelope and the specified receiving identity in the TO address of the SMTP envelope. The various types of email processing instructions are as indicated below.

Message processing instructions include and are not limited to:

Accept all messages (Accept).

Accept a certain number of messages and then reject the rest (Accept Some). This is a two part action. The first determines whether to accept or reject a message based on a counter. The second decrements the counter after a message has been accepted.

Accept any number of messages up until a particular date and then reject the rest (Accept Until).

Reject all messages (Reject).

More complex handling rules include and are not limited to:

Ask the sender to send a confirmation message before delivering the message. After receiving confirmation, create a new accept always rule that includes the current address pattern instance as the rule's address pattern key. (Confirm & Create)

Ask the receiver to verify the sender before delivering a message (Verify).

Ask the sender to send a confirmation message, then ask the receiver to verify the sender before delivering a message (Confirm & Verify).

Accept a message from a new sender and create a new accept some rule that includes the current address pattern instance as the rule's address pattern key. (Accept & Create)

After a sender has either confirmed or been verified, all of their subsequent email will continue to be accepted/rejected and so forth until the user specifies otherwise. If not confirmed/verified, the email will be rejected for receipt after a timeout, for example, 7 days.

All of the rules support defining the sender "FROM" to be any of the following:

A specific person (i.e., specific email address).

A specific group of people (i.e., specific domain or sub-group within a domain).

Everyone.

All of the rules support defining the recipient "TO" to be any of the following:

A specific identity (i.e., specific email address).

A group of identities (i.e., specific prefix with a specific domain).

A entire domain's worth of identities.

The above described list of actions is not exhaustive. Table 2 shows an example set of actions.

TABLE 2

| | |
|---|---|
| AA | Accept always and do not create a more specific rule |
| AA+ | Accept always and create more specific rule |
| ACA+ | Accept and hold until confirm, then deliver message(s) and create specific rule for F:T = Accept always. |
| ACN + n | Accept and hold until confirm, then deliver message(s) and create specific rule for F:T = Accept n-messages. |
| ACE + n | Accept and hold until confirm, then deliver message(s) and create specific rule for F:T = Accept until n days from receipt of initial message. |
| AVA+ | Accept and hold until verified, then deliver message(s) and create specific rule for F:T = Accept always. |
| AVN + n | Accept and hold until verified, then deliver message(s) and create specific rule for F:T = Accept n-messages. |
| AVE + n | Accept and hold until verified, then deliver message(s) and create specific rule for F:T = Accept until n days from initial msg. |
| ACVA+ | Accept and hold until confirm, then hold until verified, and then deliver message(s) and create specific rule for F:T = Accept always. |
| ACVN + n | Accept and hold until confirm, then hold until verified, and then deliver message(s) and create specific rule for F:T = Accept n-messages. |
| ACVE + n | Accept and hold until confirm, then hold until verified, and then deliver message(s) and create specific rule for F:T = Accept until n days from receipt of initial message. |
| ANn | Accept n-messages and then reject any additional. |
| AN + n | Create specific rule for F:T = Accept n-messages. |
| AEyyyymmdd | Accept until specified date and then reject all subsequent messages. |
| AE + n | Create specific rule for F:T = Accept until n-days from today. |
| FA(list, . . . ) | Replace current recipient with the recipient addresses contained in the list, if at least one member of the list accepts message, then accept the message. |
| FT(list, . . . ) | If first item accepts the message, then accept the message. Add each recipient in the list to the recipient list until encountering one which rejects the message. |
| R | Reject any messages. |

For all of the following, variations which include verification, confirmation or both confirmation and verification steps prior to messages being delivered and rules instantiated are supported. ('s' and 'r' can be any of the these values: P - Prefix, S - Suffix, L - LocalPart, D - Domain, B - Base Domain, M - Sub-Domain.)

| | |
|---|---|
| AMsrA: | If the sender address part specified by 's' matches the recipient part specified by 'r', then accept message. |
| AMsrNn: | If the sender address part specified by 's' matches the recipient part specified by 'r', then accept n-messages and then reject any additional. |
| AMsrEyyyymmdd: | If the sender address part specified by 's' matches the recipient part specified by 'r', then accept until specified date and then reject any additional. |
| AMsrA+: | If the sender address part specified by 's' matches the recipient part specified by 'r', then create specific rule F:T = accept all message. |
| AMsrN + n: | If the sender address part specified by 's' matches the recipient part specified by 'r', then create specific rule F:T = accept n-messages and then reject any additional. |
| AMsrE + n: | If the sender address part specified by 's' matches the recipient part specified by 'r', then create specific rule F:T = accept until n-days from now and then reject any additional. |
| AXNr+: | Using the 'r' part of the recipient, create a specified rule, F:T = Accept 'r' messages and then reject any additional. |
| AXEr+: | Using the 'r' part of the recipient, create a specified rule, F:T = Accept all messages until 'r' days from now and then reject any additional. |

(For the following, 'id' specifies either a user created or system provide template file which is used to generate a reply message to the sender.)

| | |
|---|---|
| ARA-id: | Accept all messages and auto-reply with message 'id'. |
| ARNn-id: | Accept n-messages, auto-reply to each with message 'id'. |
| AREyyyymmdd-id: | Accept all messages until specified date auto-reply with message 'id'. |
| RA+-id: | Create a specific rule, F:T = Accept all messages and auto-reply with message 'id'. |
| RN + n-id: | Create a specific rule, F:T = Accept n-messages, auto-reply to each with message 'id'. |
| ARE + n-id: | Create a specific rule, accept all messages until n days from now, auto-reply to each with message 'id'. |

The following discusses inbound automated rules update. The AIRDB component 512 can be updated passively through the normal use of email, and through the use of several special email addresses recognized by the system. That is, users of the system can update rules without recourse to the ADMIN Web-based administration interface. A user can add correspondents to the user's rule base in the following ways:

Sending an particular email to a correspondent adds a rule that accepts email having the same address pattern instance as the particular email.

Sending a reply to a Verify request, which was sent in response to a particular email from a correspondent, adds a rule that accepts future email having the same address pattern instance as the particular email. In addition, the system delivers any pending emails having the same address pattern instance as the particular email.

Forwarding of an inbound email to the special email addresses, used for Accept and Reject. The special email addresses are formed using accept or reject suffixes to the prefix address for an email account, for example:

Forwarding an email from a correspondent to my-accept@there.com adds a rule that accepts future emails from the correspondent. The rule can be made to apply to all of the user's identities (e.g., all of the user's aliases) or only to the identity specified in the email forwarded.

Forwarding an email from a correspondent to my-reject@there.com adds a rule that rejects future emails from the correspondent. The rule can be made to apply to all of the user's identities (e.g., all of the user's aliases) or only to the identity specified in the email forwarded.

Repeatedly forwarding to either of these addresses adds additional rules that are less specific than those described above. That is, each additional instance of forwarding adds a less specific rule (i.e., one having a less specific address pattern key). This generalization continues until an entire domain and any of its sub domain are accepted or rejected.

The AIRDB component 412 can be updated actively, i.e., by input through the Web-based administrative interface.

The SMTPD server 502 uses a MailID field that is inserted into the subject line of each inbound email to identify which pair of identities is to be confirmed or rejected. The MailID field is used to identify the specific address pattern instance for use with the REJECT and ACCEPT special addresses. This feature allows consistent behavior across all email clients. This unique identifier can be added to the subject line to provide a consistent way of identifying the specific SENDER and RECIPIENT for the message. The unique identifier is used by the ACCEPT and REJECT process to create the appropriate rules for the pair of FROM-TO addresses. While the SENDER and RECIPIENT information can be extracted from the headers of the message, not all email clients pass all of the headers back to the system when replying to messages. The MailID in the subject line is thus needed to ensure consistent behavior across clients.

The following describes outbound email processing and rules updating. In order to send email, users set their email client to point to the SMTPD Server. The server will relay email from the client provided the user has checked their mailbox in a specified period, e.g. in the past 15 minutes. SMTPD will do the following to all outbound email:

If the "FROM" identity:

Matches the user's defined replacement string (e.g. my-replaceme@there.com) then the server uses the "TO" address to find the either a preferred identity or the default identity in the case this is a new recipient, and alters the "FROM" address accordingly; OR Is a valid identity for the user and is not the replacement string, then SMTPD will set the preferred identity for the "TO" address to this value. This will either setup a new mapping of the identity or override a previous one.

Next, the server adds an entry in an appropriate rule for the used identity to allow any future email from the "TO" address to be accepted without any further processing.

Email is then sent to the recipient as per normal SMTP processing

The SMTP server 502 implements the following properties and features.

A contact alias is provided that is a place holder for triggering substitution of a consistent sender-to-receiver contact alias.

A default sender contact alias is provided to be used if one is not specified or available, such as when the receiver sends a message to a new intended recipient.

A set of default rules is provided to be used for defining access and processing rules for new intended recipients with whom the sender has initiated communications. Table 3 below shows an example set of the default rules.

A set of access and processing rules is provided for deciding what to do when inbound email is processed for specific sender contact alias and receiver contact alias pairs or patterns of such pairs. A minimal set of rules is specified below.

A set of intended recipient contact alias or pattern to sender contact alias preference information is provided for use in maintaining a consistent sender contact alias for specific receivers or groups of receivers.

A set of email alias or email alias patterns to mailbox information is provided for use in processing inbound and outbound email.

TABLE 3

Possible Default Actions for outgoing email where reply email is not covered by an accept-variant:

| | |
|---|---|
| Accept: | Sending email to an address authorizes that address to reply back to the sending address without further authorization |
| Ntimes-N: | Sending email to an address authorized that address to reply back to the sending address up to N messages after which further email will be rejected |
| Expires-N: | Sending email to an address authorizes that address to reply back to the sending address for up to N days from the date of the initial message |

TABLE 3-continued

If the action for the reverse (reply) rule is:

| | |
|---|---|
| Accept | Nothing needs to be done |
| Accept N-msgs | If empty, increase authorized message count by 'empty-add' |
| Accept until | If expired, increase authorized time period by 'expired-add' |
| Confirm/Verify | Add appropriate rule w/o requiring confirm or verify |
| Pending | Convert as if confirmed/verified and deliver all pending email |
| Reject | Use default action for previously unspecified new recipients. |

In one implementation, the SMTP server 502 can have at least the minimum implementation as specified in 4.5.1 Minimum Implementation, RFC 2821, "Simple Mail Transfer Protocol", J. Kleinsin, Editor, April 2001. In response to a MAIL command, the system can identify if the sender is a valid system user such that outbound email processing behaviors should be used. In response to a RCPT command, the system can identify if the receiver is a valid system user such that inbound email processing behaviors should be used. If outbound processing has been specified and if the sender contact alias matches the placeholder contact alias or pattern, then the system can substitute in the FROM field of the message either the sender contact alias associated with the intended recipient or the default contact alias if a previous mapping does not exist. If inbound processing has been specified, the system can find the first rule for the receiver's mailbox that matches the sender contact alias and receiver alias used by the sender and, furthermore, use the first part of the action to decide whether to reject or accept the message. If no rule is found, then the system can reject the message. If neither inbound or outbound processing has been specified, then the server should handle the relay request as per site specific configurations as specified in RFC 2821.

After successful processing of a DATA command the following actions may be taken or they may be delayed until after the currently connected SMTP client, server or relay exits the session. If a substitution of sender contact alias was performed after the RCPT command, then the system can rewrite the affected areas of the message body to match. For inbound email, the system can execute the second part of the rule that matched. For outbound email for non-system users, the system can send the email to the receiver using standard SMTP protocols and procedures as specified in RFC 2821.

FETCH—POP3 Client

FETCH is used to regularly retrieve email from remote 3rd party POP3 servers, as configured by each user. FETCH makes use of the rules engine, so that retrieved email is subject to most of the same acceptance rules used for inbound email from SMTPD. The variations in rule processing occur because the semantics of some of the rules do not make sense when applied to retrieved email, for example:

Confirmation of incoming email cannot be handled since the confirmation message would be from a different email identity than the one being retrieved Initially, a blanket rejection of retrieved email cannot be handled since there is no processing of outbound email on the external email account that would allow for the learning of acceptable correspondents.

After processing an external email account for a period of time, the user could set the rule to reject any new senders while allowing all previously authorized users to continue using that address.

In one implementation, POPD complies with RFC 1939 (POP3 Commands and Responses), using plain text authentication.

POPD—POP3 Server

POPD is a POP3 Server that handles incoming POP3 client access according to a protocol, e.g., RFC 1939 (POP3 Commands and Responses), using either plain text or APOP authentication. RFC 1939 compliance ensures that POPD interoperates with the user's preferred email client (e.g., Outlook Express, Outlook, Eudora, Netscape Mail, etc.). POPD does not require use of the rules engine, but does make use of AIRDB in order to confirm user access and to find the users email.

ADMIN—User Account, Domain and Identity Administration:

While the user can accomplish most tasks simply using their preferred email client, there are some operations that require a more sophisticated interface. ADMIN is a web application that supports the following:

User account creation, payments and renewals
Domain email service setup and administration
Default identity specification
Creation of new domain identity groups
Modification of rules for specific identities and groups of identities to either increase or decrease protection for those identities In one implementation, the Boa HTTP Server provides the platform on which this application runs. This open source server was built with a security and performance focus.

The management utilities implement the following properties and features.

Support system level mailbox operations:
  Establishing of a new mailbox defining a set of email contact aliases and pattern(s) that map to the mailbox, an initial set of access and processing rules, initial values for placeholder and default-sender as describe above in the SMTP server description.
  Modification of existing mailboxes to view, add, modify or delete existing email alias or pattern(s) that map receiver contact aliases to mailboxes.
  Removal of the mappings and all associated files and data for a specific mailbox.
Support mailbox level operations:
  View, add, modify, delete preferred sender contact alias information for target receivers or patterns of receivers.
  View, add, modify, delete access and processing rules These management utilities can be implemented in both a Web-based system and an email based system. The Web-based system provides authentication of the user and supports all of the above list of behaviors and properties. The email based system provides as a minimum the ability to set basic rules for specific contact alias pairings as a result of forwarding or redirecting email to specific receiver contact aliases. The minimal set of actions can include setting the following types of rules for the specific contact alias pairing contained in the email: Reject always; and accept always. The type of rule to be created can be based on the receiver contact alias.

Figure 6A:
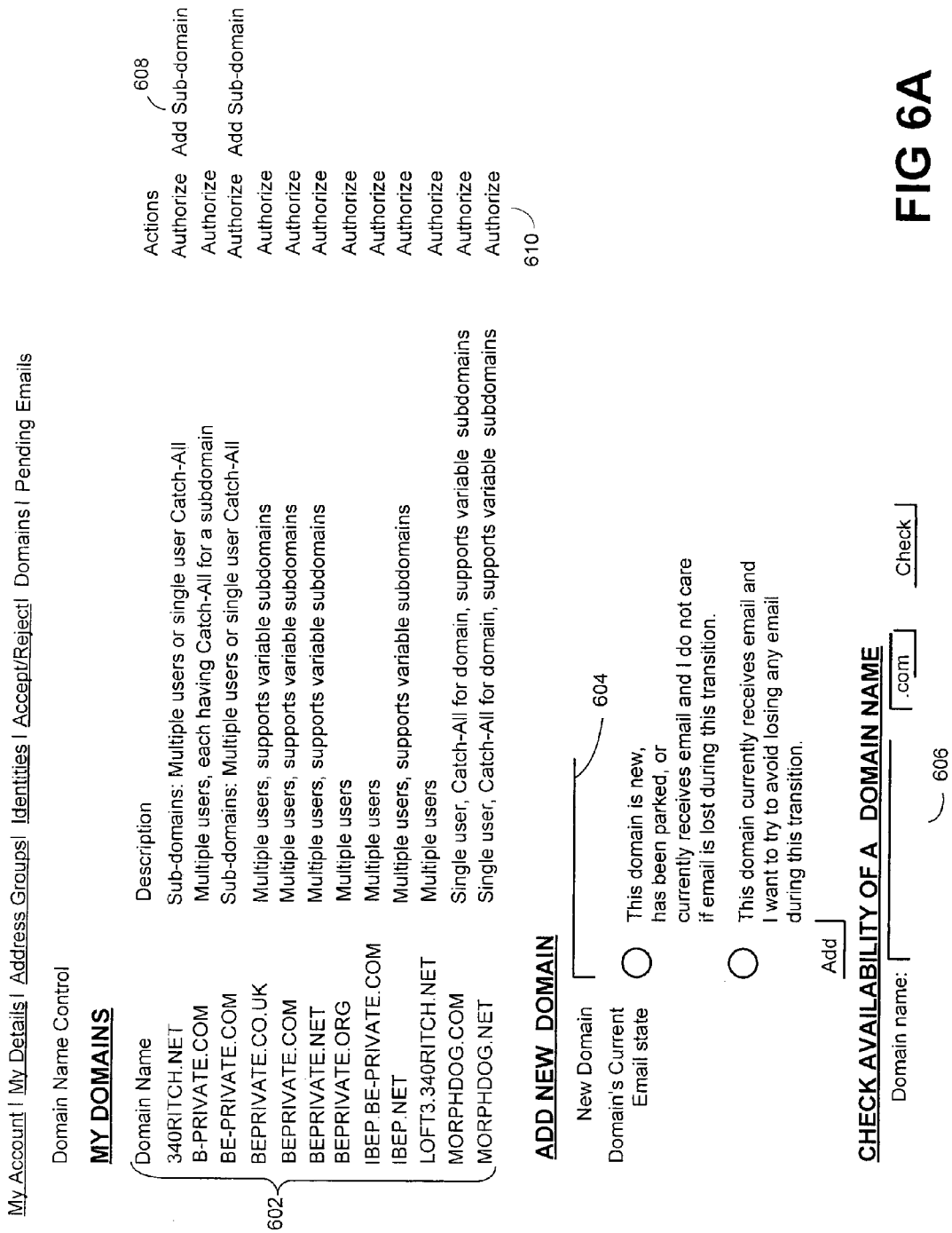

FIGS. 6A-6F show examples of administrative interfaces, one or more of which can be Web-based. FIG. 6A shows an example of an administrative interface for managing email domains. The interface includes a list 602 of domains being managed by the system. The interface includes a field 604 for adding domains to be to be managed by the system. The interface includes a field 606 for checking availability of a domain name. The interface includes elements, such as element 608, for adding sub-domains to a domain. The interface includes elements, such as element 610, for specifying actions to be taken for each domain. FIG. 6B shows an administrative interface for configuring an email domain. The administrative interface allows a user to specify whether the new domain will be a multi-user domain or a single-user domain. The administrative interface also allows the user to specify Domain Name System setup options.

FIG. 6C shows an example of an administrative interface for managing address groups. A user can add an address group by using one of the user's own domain names, using another's domain name, and retrieving one of the user's POP account. The interface includes a field 614 for adding one of the user's domain names. The interface includes a field 616 for adding a domain name of another. The interface includes a field 618 for retrieving one of the user's POP account.

Figure 6D:
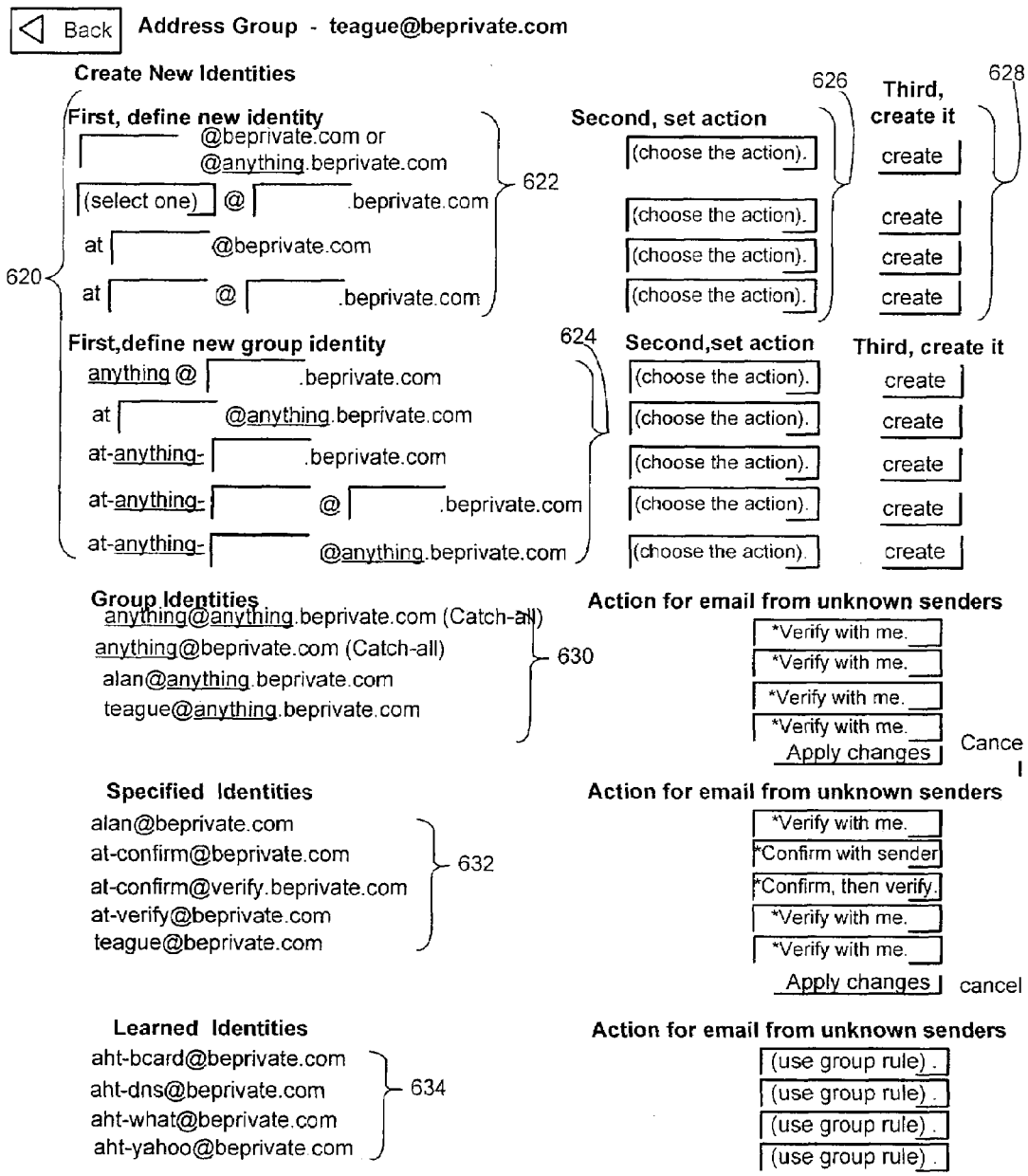

For each address group, the user can specify one or more identities for the system to manage. FIG. 6D shows an example of an administrative interface for managing identities. The interface includes an area 620 for creating new identities. Area 620 includes an area 622 for defining new identities and an area 624 for defining new group identities. The administrative interface includes fields, such as field 626, for specifying actions to be taken with respect to the newly defined identities or group identities. The administrative interface includes elements which actuation creates the identities and corresponding rules. The administrative interface also includes lists of identities being managed by the system such as, for example, list 630 for showing group identities, list 632 for showing identities specified by the user, and list 634 for showing identities that are learned and passively created by the system in response to the user's use of the system.

FIG. 6E shows an administrative interface for managing aliases. The administrative interface includes an area 636 for specifying the default identity. The administrative interface includes an area 638 for specifying preferred identities for sending emails. The administrative interface includes a list 640 of recipients (i.e., the intended recipients) and a list 642 of aliases to be used to correspond with the recipients.

FIG. 6F shows an administrative interface for managing accept/reject (i.e., access and processing) rules. The administrative interface includes an area 644 for a display filter. The user may wish to use the filter to display a subset of the set of recipients with whom the user corresponds. The administrative interface includes a list 646 of recipients. The administrative interface includes a list 648 of the user's aliases to be used when corresponding with the respective recipients. The administrative interface includes fields 650 of actions that specify actions to be taken for messages sent from the recipient and addressed to the alias specified.

WEB—Web Email Client

While a user may use their preferred email client, not all clients provide features which allow users to access all of the flexibly of the system. The WEB application provides a standard web based email client with specific additions to make the dynamic creation of new identities easy and fast.

WEB provides all of the core email functionality that is required to read, write, delete, forward, reply and deal with attachments. In one implementation, this application runs on top of the Open Source Boa HTTP server for performance, security and scalability reasons.

Domain Management

The SMTP server 402, like other SMTP mail transfer agents, is configured to handle email for particular Internet Domains. Internet Domains can come in a variety of types, based on the use to which the domain will be put. Domains can either be used to serve email to a single user or to multiple users. Single user domains are known as "Catch-All" domains because all email destined for the domain (whatever the specific address used) is delivered to a single mailbox. Multiple user domains can have an unlimited number of users, each of which may have many distinct identities. Every mailbox can aggregate multiple email identities from one or more domains or sub-domains, regardless of the type of the domains. Unlike other mail systems, the system proposes to allow every user to have an unlimited number of identities, spread across a variety of Internet Domains.

The possible configurations for providing email service to a domain are as indicated below.

Multiple User Domain Configurations:

| | |
|---|---|
| Type A | Fixed identity with a prefix for defining new identities. Each user has a specific identity like "bob@there.com" along with a prefix that they can use to create additional identities such as "bob-anything@there.com". |
| Type B. | Sub-domains for either groups or individuals. Each domain can have sub-domains like "sales.there.com" for handling groups of associated people, or a sub-domain may be for individual use as a "Catch-All" sub-domain such as "ceo.there.com". |
| Type C. | Fixed identity with both a prefix and variable sub-domains for defining new identities. Each user has a specific identity like "bob@there.com" and a prefix that they can use to create additional identities such as "bob-anything@there.com". In addition, the user can create new sub-domains like "bob@support.there.com" or bob-Yahoo@web.there.com to add even greater flexibility in defining new identities. |

-continued

Type D. Fixed sub-domain as a "Catch-All" for defining new identities. Each user has a specific sub-domain like "ceo.there.com" or "bob.there.com" which is used as a "Catch-All" domain. This allows each user great freedom in defining new identities since any address that ends with their sub-domain like "sales-info@bob.there.com" will be delivered to them.

Single User Domain Configurations:

Type E. "Catch-All" domain for defining new identities. Each user has a specific domain like "bobjones.com" which is used as a "Catch-All" domain. This allows the user great freedom in defining new identities since any address that ends with their domain like "info@bobjones.com" will be delivered to them.

Type F. "Catch-All" domain with variable sub-domains for defining new identities. Each user has a specific domain like "bobjones.com" which is used as a "Catch-All" domain. This allows the user great freedom in defining new identities since any address that ends with their domain like "info@bobjones.com" will be delivered to them. ". In addition, the user can create new sub-domains like "robert@supportbobjones.com" or "yahoo@chat.bobjones.com" to add even greater flexibility in defining new identities.

Alternatives

Voice Messages

For voice communication networks, one implementation utilizes either a software program or hardware instantiation of the software running in the central telephone office which provides the point-of-entry for the user or a software or hardware instantiation of the software running at the end-point of the telephone connection (e.g., the user's telephone is connected to a fax/data/voice modem card which runs the server software) and associated management utilities that implements the details of the system and method of the present invention. The management utilities can support both a Web-base (e.g., one that uses HTTP(S)) and voice/keypad interactive system. The contact alias for voice networks is defined as a telephone number which ultimately maps to a specific telephone or centralized phone system (e.g., local phone system for an office). A minimal set of rules for voice communications includes: Accept call and ring through, Forward call to voice mail, Forward call to another number, Reject the call with a specific message, Request entering of a response to a specific question and redirect call based on the answer. All of the properties of the rules specified for email are applicable for this situation.

Data Messages

For data communication networks, one implementation utilizes either a software program or hardware instantiation of the software running in the central telephone office which provides the point-of-entry for the user or a software or hardware instantiation of the software running at the end-point of the telephone connection (e.g., the user's telephone is connected to a fax/data/voice modem card which runs the server software) and associated management utilities that implements the details of the system. The management utilities, in one implementation, can support both a Web-based and voice/keypad interactive system. The contact alias for data networks is defined as a telephone number which ultimately maps to a specific facsimile machine or facsimile emulator or centralized phone system (e.g., local phone system for an office). The minimal set of rules associated with voice communication networks would also apply to data communication networks. All of the properties of the rules specified for email are applicable for this network.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. The rules base can include rules that are based on an access control list. The rules can restrict outbound mail, for example, to limit communications to an approved set of correspondents via a form of centrally-managed outbound rule base.

What is claimed is:

1. A computer-implemented method for processing messages, the method comprising:
   maintaining rules of which a first rule specifies a first alias of a first sender to be used for messages sent from the first sender to a first group of one or more intended recipients, and a second rule that specifies a second alias of the first sender to be used for messages sent from the first sender to a second group of one or more other recipients
   receiving a first message from the first sender to the one or more intended recipients of the first group;
   changing the first message so that address information presented shows the first alias of the first sender;
   receiving a second message from the first sender, the message having a particular intended recipient;
   determining which of the first and second groups includes the particular intended recipient;
   selecting one of the first rule and the second rule based on a result of the determining; and
   changing the second message so that the address information presented shows the alias specified by the rule selected.

2. The method of claim 1, wherein the first rule includes a first recipient-address pattern key that specifies the first group of one or more intended recipients, and the second rule includes a second recipient-address pattern key that specifies the second group of one or more other recipients, the method further comprising:
   defining a recipient-address pattern instance for the second message based on a matching of the recipient-address pattern instance with the recipient-address pattern keys.

3. The method of claim 1, wherein:
maintaining rules includes maintaining rules that include recipient-address pattern keys that are regular expressions.

4. The method of claim 1, wherein:
changing the first message includes changing the first message in response to input from the sender.

5. The method of claim 4, wherein:
changing the first message in response to input includes changing the first message in response to the sender placing a particular string in the first message.

6. The method of claim 4, wherein:
changing the first message in response to input includes changing the first message in response to input received through an administrative interface.

7. The method of claim 1, wherein the first message received includes a new alias that is different from the first alias specified in the first rule, the method further comprising:
   determining whether the first sender wants to use the new alias or the first alias specified in the first rule; and
   updating the first rule to specify the new alias when it is determined that the first sender wants to use the new alias.

8. The method of claim 1, wherein:
receiving a first message includes receiving an email.

9. The method of claim 1, wherein:
receiving a first message includes receiving an short-message-service ("SMS") message.

10. The method of claim 1, wherein:
receiving a first message includes receiving a fax message.

11. The method of claim 1, wherein:
receiving a first message includes receiving a voice message.

12. The method of claim 1, wherein:
receiving a first message includes receiving an instant message.

13. The method of claim 1, wherein
selecting one of the first rule and the second rule is, based on which of the first sender and the second sender sent the second message.

14. The method of claim 1, further comprising:
receiving a message from an entity who is not one of the intended recipients of the first group, the message being addressed to a particular alias of the first sender; and
defining a new rule that specifies that the particular alias is to be used when the first sender sends messages to the entity.

15. The method of claim 1, further comprising:
selecting the first rule.

16. The method of claim 15, wherein:
an address pattern key of the first rule is more specific than an address pattern key of the second rule; and
the selection is based on a level of specificity of the first rule and the second rule.

17. The method of claim 16, wherein:
the selection is based on an order of priority in which the first rule has a higher order than does the second rule.

18. A computer program product, tangibly stored on machine readable medium, for processing messages, the product comprising instructions operable to cause a programmable processor to:

maintain rules of which a first rule specifies a first alias of a first sender to be used for messages sent from the first sender to a first group of one or more intended recipients, and a second rule that specifies a second alias of the first sender to be used for messages sent from the first sender to a second group of one or more other recipients;

receive a first message from the first sender to the one or more intended recipients of the first group;

change the first message so that address information presented shows the first alias of the first sender;

receive a second message from the first sender, the message having a particular intended recipient;

determine which of the first and second groups includes the particular intended recipient;

select one of the first rule and the second rule based on the a result of the determination; and change the second message so that the address information presented shows the alias specified by the rule selected.

19. The product of claim 18, wherein the first rule includes a first recipient-address pattern key that specifies the first group of the one or more intended recipients, and the second rule includes a second recipient-address pattern key that specifies the second group of the one or more other recipients, the product further comprising instructions to:

define a recipient-address pattern instance for the second message based on a matching of the recipient-address pattern instance with the recipient-address pattern keys.

20. The product of claim 19, wherein:
the rules include recipient-address pattern keys that are regular expressions.

21. The product of claim 18, the product further comprising instructions to:
change the first message in response to input from the sender.

22. The product of claim 21, the product further comprising instructions to:
change the first message in response to the sender placing a particular string in the first message.

23. The product of claim 22, the product further comprising instructions to:
change the first message in response to input received through an administrative interface.

24. The product of claim 18, wherein the first message received includes a new alias that is different from the first alias specified in the first rule, the product further comprising instructions to:
determine whether the first sender wants to use the new alias or the first alias specified in the first rule; and
update the first rule to specify the new alias when it is determined that the first sender wants to use the new alias.

25. The product of claim 18, the product further comprising instructions to:
receive a first message that is an email.

26. The product of claim 18, further comprising instructions to:
receive a first message that is a short-message-service ("SMS") message.

27. The product of claim 18, further comprising instructions to:
receive a first message that is a fax message.

28. The product of claim 18, further comprising instructions to:
receive a first message that is a voice message.

29. The product of claim 18, further comprising instructions to:
receive a first message that is an instant message.

30. The product of claim 18, further comprising instructions to:
in response to receiving a second message, select one of the first rule and the second rule, based on which of the first sender and the second sender sent the second message.

31. The product of claim 18, further comprising instructions to:
receive a message from an entity who is not one of the intended recipients of the first group, the message being addressed to a particular alias of the first sender; and
define a new rule that specifies that the particular alias is to be used when the first sender sends messages to the entity.

32. The product of claim 18, further comprising instructions to:
select the first rule.

33. The product of claim 32, wherein:
an address pattern key of the first rule is more specific than an address pattern key of the second rule; and
the selection is based on a level of specificity of the first rule and the second rule.

34. The product of claim 33, wherein:
the selection is based on an order of priority in which the first rule has a higher order than does the second rule.

* * * * *